W. B. STATON.
SLAT FOR HARVESTER REELS.
APPLICATION FILED NOV. 24, 1917.
1,309,342.
Patented July 8, 1919.
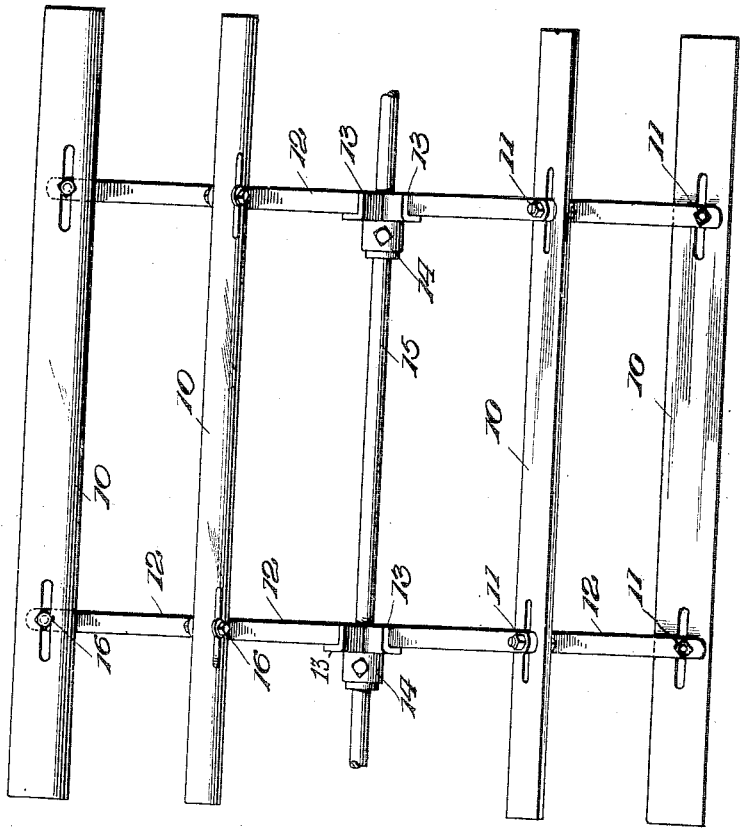
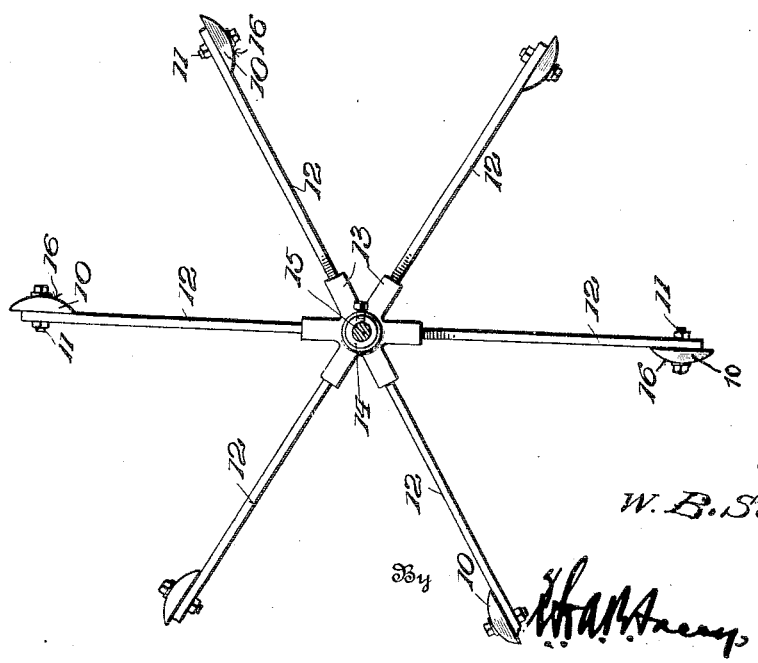
Inventor
W. B. Staton

UNITED STATES PATENT OFFICE.

WESLEY B. STATON, OF GRAY, SASKATCHEWAN, CANADA.

SLAT FOR HARVESTER-REELS.

1,309,342.     Specification of Letters Patent.     Patented July 8, 1919.

Application filed November 24, 1917. Serial No. 203,817.

*To all whom it may concern:*

Be it known that I, WESLEY B. STATON, a subject of the King of Great Britain, residing at Gray, in the Province of Saskatchewan, Canada, have invented certain new and useful Improvements in Slats for Harvester-Reels, of which the following is a specification.

This invention relates to improvements in the reels of harvesting machines, and has for one of its objects to provide a reel having slats so formed that they will not shed or thresh the grain or sever the heads when in operation.

Another object of the invention is to provide a reel with slats curved transversely on the grain engaging side to cause them to turn the grain rearwardly and downwardly toward the apron without producing a threshing or severing action upon the heads.

With these and other objects in view, the invention consists in certain novel features of construction, as hereinafter shown and described and then specifically pointed out in the claims; and in the drawings illustrative of the preferred embodiment of the invention—

Figure 1 is an end elevation of a harvester reel with the improved form of slats applied.

Fig. 2 is a side elevation.

The slats of the reels of grain harvesters, as ordinarily constructed, are oblong transversely and attached to arms radiating from hubs upon a driving shaft, and when the harvester moves forwardly the reel slats moving in a circle, engage the heads and the stalks near the heads and bend the stalks downwardly and rearwardly, or toward the apron or carrier, and in thus operating scrape along the stalks and against and over the heads. The wider flat faces of the slats and the relatively sharp corners thereof thus come in contact with the standing grain immediately prior to or simultaneously with the cutting action of the sickle and bend the stalks rearwardly or toward the apron and cause them to fall upon the apron as the sickles sever the stalks. The rapidly moving slats with their sharp corners have a tendency to "thresh" or shed the grain and likewise to sever the heads from the stalks, especially if the grain is abnormally dry or ripened. The object of the present invention is to provide a slat which while effectually acting upon the grain stalks to turn them toward the apron as they are severed will not thresh or detach the heads or sever them from the stalks. The improved slat is formed with its grain engaging face curved or segmental transversely, as shown in the drawings illustrating the application of the invention, thus obviating the objectionable action of the sharp corners of the slats.

The improved slat is represented as a whole at 10 and is attached in the ordinary manner by clamp bolts 11 to the arms 12, the arms being fitted in the usual manner in sockets 13 extending radially from a head 14, the latter being mounted upon a drive shaft 15. The slats 10 are formed with one face curved or segmental as shown at 16. The curved sides of the slats are thus the only portions which come in contact with the grain. It will be noted that this form of slat presents no sharp corners to the grain, consequently a threshing or severing action is not produced, and the grain is turned down toward the apron with the heads intact and in position to be fed to the elevator and binder.

The slats may be of any required width or thickness, but will ordinarily be about three inches wide and of a length to correspond to the length of the sickle, or the length of the "cut" of the harvester.

Having thus described the invention, what is claimed as new is:

1. In a harvester, a reel including pairs of radial arms, and slats each having one side thereof flat and its opposite side curved transversely from one longitudinal edge of the slat to the other to present a continuously smooth surface for contact with the grain, each slat being attached to the rear faces of a pair of corresponding radial arms.

2. In a harvester, a reel including pairs of radial arms and a plurality of solid slats each having one side thereof flat and its opposite side curved transversely in a true arc of a circle from one longitudinal edge of the slat to the other and intersecting the flat face thereof to present a continuously smooth surface for contact with the grain, each slat being attached to the rear faces of a pair of corresponding radial arms.

In testimony whereof I affix my signature.

WESLEY B. STATON.

Copies of this patent may be obtained for five cents each, by addressing the "Commissioner of Patents, Washington, D. C."